United States Patent
Abe

[11] Patent Number: 6,076,258
[45] Date of Patent: Jun. 20, 2000

[54] METHOD FOR INSERT MOLDING AND METHOD FOR PRODUCING A CONNECTOR

[75] Inventor: Kimihiro Abe, Haibara-gun, Japan

[73] Assignee: Yazaki Corporation, Tokyo, Japan

[21] Appl. No.: 08/845,049

[22] Filed: Apr. 21, 1997

[30] Foreign Application Priority Data

Apr. 23, 1996 [JP] Japan ................................ 8-100992

[51] Int. Cl.$^7$ .................................................. H01R 43/00
[52] U.S. Cl. ................... 29/883; 29/874; 29/882
[58] Field of Search .......................... 29/882, 883, 884, 29/827, 874

[56] References Cited

U.S. PATENT DOCUMENTS

| | | | |
|---|---|---|---|
| 3,252,206 | 5/1966 | Stevens . | |
| 3,469,312 | 9/1969 | Leyssens et al. | 29/883 |
| 4,337,574 | 7/1982 | Hughes et al. | 29/883 |
| 4,380,119 | 4/1983 | Normann et al. . | |
| 4,388,757 | 6/1983 | Takeyama et al. | 29/883 X |
| 4,821,413 | 4/1989 | Schmitt et al. | 29/883 |
| 4,854,041 | 8/1989 | Saito et al. | 29/883 X |
| 5,074,039 | 12/1991 | Hillbish et al. | 29/883 |
| 5,274,918 | 1/1994 | Reed | 29/883 X |
| 5,573,410 | 11/1996 | Stepniak | 29/883 X |
| 5,761,805 | 6/1998 | Guyer | 29/883 |

FOREIGN PATENT DOCUMENTS

| | | |
|---|---|---|
| 61-206903 | 9/1986 | Japan . |
| 7-88882 | 4/1995 | Japan . |
| 8-022878 | 1/1996 | Japan . |

*Primary Examiner*—Carl J. Arbes
*Attorney, Agent, or Firm*—Armstrong, Westerman, Hattori, McLeland & Naughton

[57] ABSTRACT

A method for insert molding comprises the steps of assembling an insert to a holder, the holder having a support for the insert; setting the assembled insert and holder inside a metal mold; and casting resin into the metal mold. This invention dissolves the difficulty in holding the insert in position during molding and provides an insert-embedded product at a smaller number of insert moldings than conventionally required.

8 Claims, 3 Drawing Sheets

METHOD FOR INSERT MOLDING AND METHOD FOR PRODUCING A CONNECTOR

BACKGROUND OF THE INVENTION

1. Field of the Invention

This invention relates to a method for insert molding, and more particularly to a method for producing connectors.

2. Description of the Related Art

There have been proposed various techniques for holding an insert in position in producing an insert-embedded molding.

For example, a technique disclosed by Japanese Patent Application Laid-Open Specification No. 7-88882 is as shown in FIG. 6A, which is a sectional view of a distribution box A having a connector portion a at an outer side thereof.

In this figure, denoted b is a busbar which electrically connects an upper terminal in the connector portion a to a body portion c of the distribution box A. Denoted d is a busbar which electrically connects a lower terminal in the connector portion a to the outside of the distribution box A.

This distribution box A is produced by setting the busbars b and d in a cavity E defined by an upper die B, lower die C and slide die D as shown in FIG. 6B and casting (injecting) resin into the cavity. In this instance, the busbar b is held between a projection C1 provided on the lower die C and the upper die B so as to be set in position during molding.

The insert-holding technique as mentioned above, however, is not employable where a plurality of inserts are provided in tiers extending parallel to each other, i.e., in such a case where the busbar d of the lower terminal in FIG. 6B is extended parallel to the busbar b to electrically connect to the body portion c of the distribution box A. This is because both parallel, spaced busbars b, d cannot be held in position by the projection C1 and the upper die B. If not held in position during molding, the inserts may contact each other inside the molding, and/or connecting portions cannot be obtained at positions required in the distribution box, resulting in the distribution box unreliable.

To cope with this drawback, in the above-mentioned Japanese Patent Application Laid-Open Specification No. 7-88882, a unit f as shown in FIG. 6C is provided which is separate from the distribution box A, which has a terminal e contained therein as an insert, and which is fitted in the connector portion a of the distribution box A to dispose the terminal e at a position parallel to and in tiers with the busbar b.

In this case, however, two operation of insert molding must be done to obtain a single product, which is troublesome, and since the unit f is a separate part, a fear arises that it may get out of place during the fitting of a mating connector to, or its detaching from, the connector portion a, resulting in.

A further drawback is that the conventional technique is not employable where the distribution box A requires water-proofness because the use of the projection C1 leaves a hole in the product, which may allow water to penetrate therethrough. Thus, with the conventional technique, there are no practical means for holding a busbar in position where waterproofness is required.

Further, where inserts are electrically connected busbars, the conventional technique requires a slide die such as D in FIG. 6B to prevent resin from adhering to their portions of contact with mating terminals, resulting in an increase of die production costs and in possible problem with the slide die during molding.

SUMMARY OF THE INVENTION

This invention has been accomplished to overcome the above drawbacks and an object of this invention is to provide a method of producing an insert-containing molding which eliminate the difficulty of holding inserts in position during molding, which does not require a slide die, and which requires a smaller number of insert molding operation than conventionally required.

In order to attain the object, according to an aspect of this invention, there is provided a method for insert molding comprising the steps of assembling an insert to a holder, the holder having a support for the insert; setting the assembled insert and holder inside a metal mold; and casting resin into the metal mold.

The support prevents deflections and/or deformations of the insert and maintains the insert in position during the casting of resin into the mold.

Preferably, the holder including the support is of the same resin as that from which a molding is formed. In this way, distortions are prevented which would otherwise take place in the molding.

Preferably, the support comprises a plate and the insert is laid on the plate.

Advantageously, the method further comprises the step of bending an end portion of the insert along an end surface of the plate such that when set inside the metal mold the end portion of the insert is held between the metal mold and the plate.

Preferably, a plurality of the inserts and a plurality of the holders are provided, each insert being assembled to the respective holder, and the method further comprises the step of assembling the holders together in advance to the setting inside the metal mold such that the plurality of inserts are at least partially arranged in opposed, parallel relation in a molding.

According to another aspect of this invention, there is provided a method for producing a connector comprising the steps of assembling a terminal intermediate to a holder, the terminal intermediate having a plurality of terminals joined in a row by connection portions between neighboring ones of the terminals, the holder having a support for the terminals; cutting the connection portions of the terminal intermediate to separate the terminals from each other; setting the assembled terminals and holder inside a metal mold; and casting resin into the metal mold.

Preferably, the metal mold comprises a resin flow prevention mechanism for preventing resin from flowing onto terminal-lug constituting portions of the terminals.

Preferably, the resin flow prevention mechanism comprises an empty space provided in the mold at a position adjacent to each of the terminal-lug constituting portions of the terminals.

This invention is also advantageously used where the insert comprises a plurality of conductors such as busbars arranged in tiers in a molding. In other words, this invention prevents these conductors from contacting each other inside the molding and keeps their electrically connecting portions substantially free of resin to provide easy-to-connect portions.

DESCRIPTION OF THE PREFERRED EMBODIMENTS

Figure 6C:
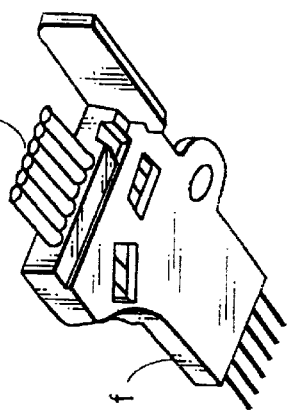
FIG. 6C is a perspective view of a separate unit used in combination with the intermediate product of FIG. 6A.
Figure 6A:
FIG. 6A is a sectional view of an intermediate product according to a conventional insert molding method.
Figure 6B:
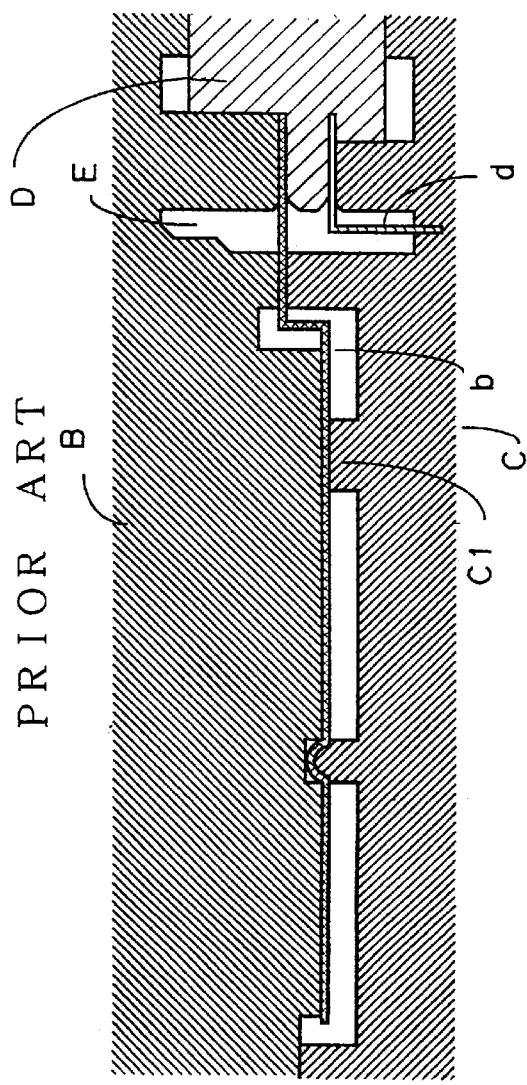
FIG. 6B is a sectional view of dies for obtaining the intermediate product of FIG. 6A.

Embodiments will now be described with reference to the attached drawings, in which, by way of example, a method for insert molding according to this invention is applied to the production of a connector. This invention, however, is applicable not only to the production of connectors, but also to the production of various distribution boxes such as that shown in FIG. 6A which have conductors such as busbars therein as well as to the production of all kinds of insert moldings.

Figures 1, 2A, 2B:
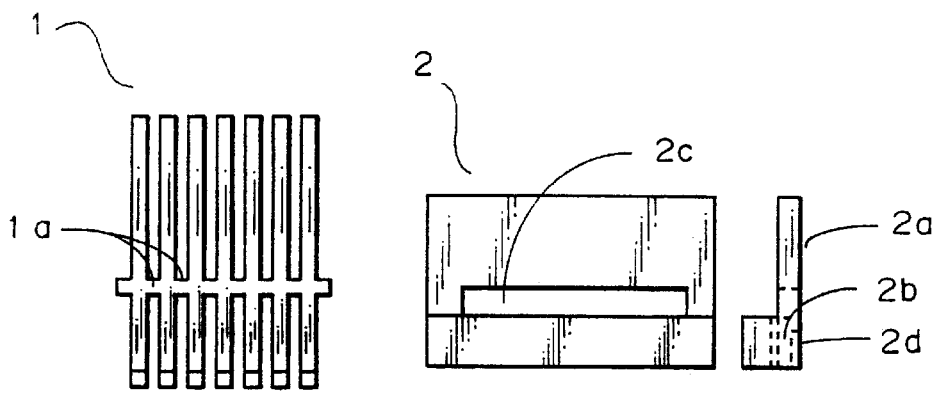
FIG. 1 is a plan view of a terminal intermediate.
FIGS. 2A and 2B are plan and side views, respectively, of a holder.

Designated 1 in FIG. 1 is a terminal intermediate having a plurality of terminals combined in a row by connection portions 1a. The connection portions 1a are removed to provide individual terminals 1'. Each terminal 1' serves as a terminal lug and busbar to be incorporated in a connector housing. The provision of terminals in the thus combined arrangement facilitates their assembling operation to a later-described holder.

FIGS. 2A and 2B are front and side views, respectively, of a holder 2 which is of the same resin as that from which the molding is formed. As best shown in FIG. 2B, the holder 2 includes a support portion 2a for the insert-constituting terminals, insertion holes 2b for insertion therein of the terminals, a cutting opening 2c used when removing the connection portions 1a of the terminal intermediate 1, and a joint portion 2d to which is joined another holder 3 (FIGS. 3D and 3E) which has substantially the same structure as that of the holder 2.

The terminal intermediate 1 and the holder 2 are assembled as shown in FIGS. 3A to 3E.

Figures 3A, 3B, 3C:
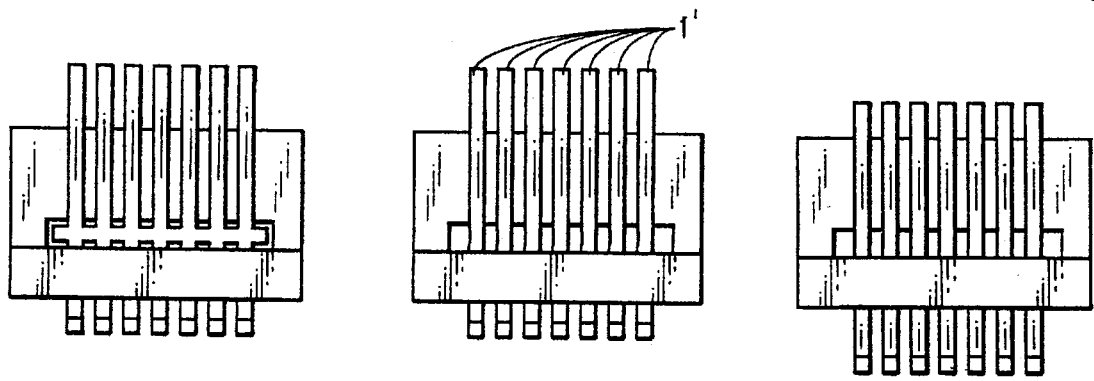
FIG. 3A is a view of the terminal intermediate inserted into the holder.
FIG. 3B is a view of the terminal intermediate whose connection portions have been removed.
FIG. 3C is a view of terminals inserted into final position.

The terminal intermediate 1 is first assembled to insert the terminals through the insertion holes 2b of the holder 2 as shown in FIG. 3A. The insertion operation of a multiplicity of terminals can be quickly finished by using the terminal intermediate 1 having the row of terminals.

Figures 3D, 3E:
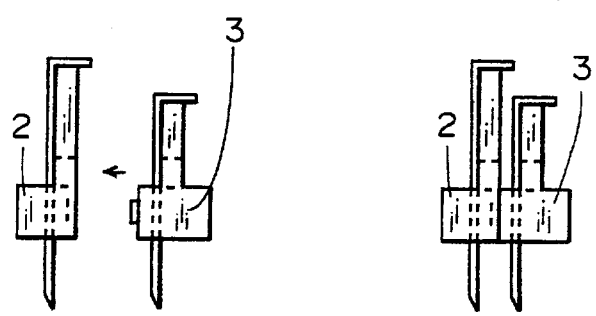
FIG. 3D is a view of holders about to be assembled.
FIG. 3E is a view of the holders assembled, with their terminals set in position.

A cutting device (not shown) is then operated through the cutting opening 2c to remove the connection portions 1a and provide independent terminals 1' (FIG. 3B), which are thereafter inserted into final position (FIG. 3C), whereat terminal-lug constituting portions of the terminals 1' are bent along an end surface of the support portion 2a (3D), and the holder 3 having terminals likewise inserted therein is integrally joined through the joint portion 2d to the holder 2 (FIG. 3E).

The reason for the separate provision of the holders 2 and 3 is that, to cut connection portions 1a from the terminal intermediate in each holder, operations need to be done from both sides of the terminal intermediate.

Insert molding is effected using the thus obtained holders, each having terminals set therein. The holders 2, 3 now held together as a unit is set in a metal mold as shown in section in FIG. 4, which metal mold comprises an upper die 4 and a lower die 5. The dies 4 and 5 are shown closed in FIG. 4, with a cavity 6 formed therebetween.

In the closed dies, the terminal-lug constituting portion 1'b of the terminal 1' is pressingly held between an inner surface of the upper die 4 and the end surface of the support portion 2a of the holder 2 to prevent the penetration of resin onto the portion 1'b during casting. In injection molding, the resin is introduced under pressure into the cavity 6, nevertheless the terminal 1' is held in position, it being supported at its terminal-lug constituting portion 1'b as mentioned above and supported on the support portion 2a of the holder 2.

Figure 4:
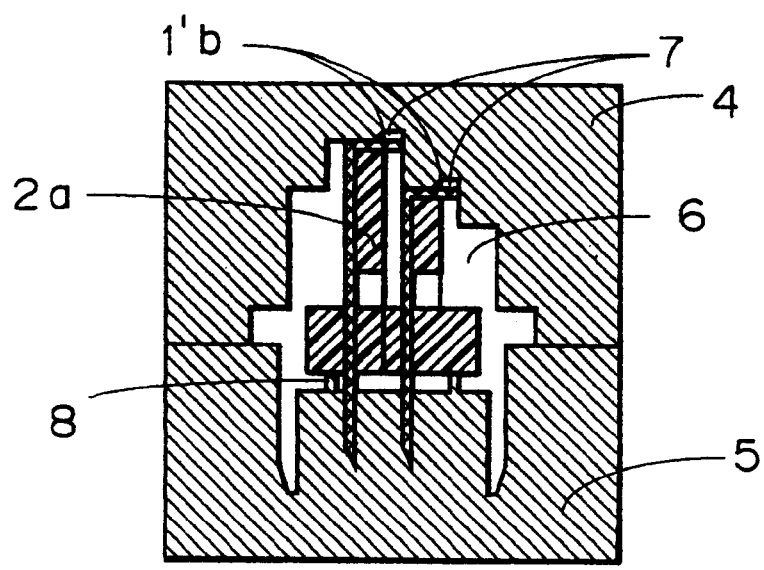
FIG. 4 is a sectional view of dies closed with the holders set therebetween, each of the holders having the respective terminal set thereon.

Denoted 7 in FIG. 4 is an empty space (resin flow prevention mechanism) for preventing the flow of resin onto an upper surface of the terminal-lug constituting portion (wire bonding portion) 1'b. If no such space is provided, in the event that a little resin penetrates through a small gap between the upper die 4 and the terminal-lug constituting portion 1b', the upper surface of the latter will be covered with the resin. The space 7 reliably keeps the terminal-lug constituting portion 1b' uncovered with the resin.

Denoted 8 in FIG. 4 are bosses via which the terminal holders 2, 3 are set on the lower die 5. The bosses 8 serve to reduce the area with which the holders directly contact the surface of the lower die 5, with the result that a reduction is made in the burr to be formed on the molding by the resin.

Figure 5:
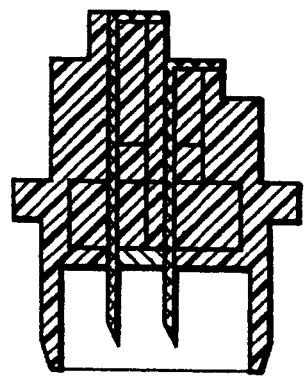
FIG. 5 is a sectional view of a product (connector having terminals as inserts) by the insert molding method according to this invention.

Thus, a product of insert molding as shown in FIG. 5 (connector housing) is obtained by setting inside a metal mold holders each with a terminal, and injecting resin into the cavity of the mold.

Having now fully described the invention, it will be apparent to one of ordinary skill in the art that many changes and modifications can be made thereto without departing from the spirit and scope of the invention as set forth herein.

What is claimed is:

1. A method for insert molding comprising the steps of:
   assembling an insert to a holder, said holder having a support for said insert;
   setting said assembled insert and holder inside a metal mold; and
   casting resin into said metal mold.

2. The method for insert molding according to claim 1, wherein said holder including said support is of the same resin as that from which a molding is formed.

3. The method for insert molding according to claim 1, wherein said support comprises a plate and said insert is laid on said plate.

4. The method for insert molding according to claim 3, further comprising the step of bending an end portion of said insert along an end surface of said plate such that when set inside said metal mold said end portion of the insert is held between said metal mold and said plate.

5. The method for insert molding according to claim 1, wherein a plurality of said inserts and a plurality of said holders are provided, each insert being assembled to said respective holder, and further comprising the step of assembling said holders together in advance to the setting inside the metal mold such that said plurality of inserts are at least partially arranged in opposed, parallel relation in a molding.

6. A method for producing a connector comprising the steps of:

assembling a terminal intermediate to a holder, said terminal intermediate having a plurality of terminals joined in a row by connection portions between neighboring ones of said terminals, said holder having a support for said terminals;

cutting said connection portions of said terminal intermediate to separate said terminals from each other;

setting said assembled terminals and holder inside a metal mold; and casting resin into said metal mold.

7. The method for producing a connector according to claim 6, wherein said metal mold comprises a resin flow prevention mechanism for preventing resin from flowing onto terminal-lug constituting portions of said terminals.

8. The method for producing a connector according to claim 6, wherein said resin flow prevention mechanism comprises an empty space provided in said mold at a position adjacent to each of said terminal-lug constituting portions of the terminals.

* * * * *